Oct. 17, 1967  R. E. STUEMKY  3,347,061

FLEXIBLE DRIVE MECHANISM

Filed Jan. 11, 1965  3 Sheets-Sheet 1

INVENTOR.
ROBERT E. STUEMKY
BY Hoffmann and Yount
ATTORNEYS

Oct. 17, 1967   R. E. STUEMKY   3,347,061
FLEXIBLE DRIVE MECHANISM
Filed Jan. 11, 1965   3 Sheets-Sheet 2

INVENTOR.
ROBERT E. STUEMKY
BY Hoffmann and Yount
ATTORNEYS

United States Patent Office 3,347,061
Patented Oct. 17, 1967

3,347,061
FLEXIBLE DRIVE MECHANISM
Robert E. Stuemky, Royal Oak, Mich., assignor to Eaton Yale & Towne Inc., a corporation of Ohio
Filed Jan. 11, 1965, Ser. No. 424,785
37 Claims. (Cl. 64—15)

The present invention relates to flexible couplings, and particularly to a universal joint including spring means for transmitting rotary motion between drive and driven members.

The principal object of the present invention is the provision of a new and improved universal joint including spring means for transmitting rotary motion between drive and driven members and which is constructed so as to be capable of handling loads of the magnitude encountered in the drive line of vehicles, and is extremely durable and highly reliable in operation.

Another object of the present invention is the provision of a new and improved universal joint including spring means for transmitting rotary motion between drive and driven members and constructed so as to minimize the tendency for the springs to buckle and roll relative to each other with the attendant stresses thereon.

A further object of the present invention is the provision of a new and improved universal joint including a plurality of coaxially extending nested or telescoped spring sleeves which are in radial abutting engagement with the adjacent coils or helices being axially spaced so as to provide a universal joint having a minimum amount of drive line "clunk" or backlash due to radial contact of the coils of the spring and a minimum amount of vibration of the drive line due to abutment of the axially adjacent helices of the springs during transmission of torque between the members between which the universal joint is connected.

An additional object of the present invention is the provision of a new and improved universal joint for transmitting rotary motion between driving and driven members and which comprises a plurality of coaxially extending nested or telescoped spring sleeves each comprised of a plurality of spring members with the spring members in the spring sleeves having a lead angle and a spring index of a magnitude such as to minimize buckling of the spring sleeves and rolling of the adjacent coils on each other which cause local stresses and failure of the universal joint.

Yet another object of the present invention is the provision of a new and improved universal joint including three coaxially extending nested or telescoped spring sleeves which are in radial abutting engagement, and with the adjacent helices of the spring sleeves being axially spaced and wherein the inner, middle, and outer spring sleeves are comprised of a plurality of spring members within the range of 4–6, 4–6, and 5–7, respectively, and wherein the spring index of the spring members comprising the inner, middle, and outer spring sleeves is within the range of 7–11, 9–13, and 11–15, respectively, and further wherein the lead angle of the individual spring members comprising the inner, middle, and outer spring sleeves is 9–16°, 6–12°, and 6–12°, respectively.

Still another object of the present invention is the provision of a new and improved universal joint comprising a plurality of coaxially extended, nested or telescoped spring sleeves, each of which comprises a plurality of spring members and wherein the innermost sleeve includes five, open wound, coil springs which are interdigitated to form the spring sleeve; the middle spring sleeve comprises five, open wound, coil spring members interdigitated to form the middle spring sleeve; and the outer spring sleeve comprises six, open wound, coil spring members which are interdigitated to form the outer most spring sleeve.

A still further object of the present invention is the provision of a new and improved universal joint wherein spring means comprising nested telescoped spring sleeves transmit torque between driven and driving members having recesses in which the spring sleeves are secured and wherein the ends of the individual springs forming the spring sleeves lie on a circle and are spaced therearound in a manner to facilitate their insertion into the recesses in the drive and driven members without the snagging thereof on the coils of the other spring sleeve.

Yet another object of the present invention is the provision of a new and improved universal joint, as noted in the next preceding paragraph, wherein the spacing of the ends of the springs is such as to provide substantial interference at the bottom of the radially spaced walls defining the recess of the drive and driven members.

Still another object of the present invention is the provision of a new and improved method of assembly of a universal joint comprising a plurality of coaxially extending nested or telescoped spring sleeves wherein at least one of the spring sleeves has the adjacent helices thereof axially spaced a distance greater than the other, and wherein the spring sleeve having the greater axial spacing between the helices, during the assembly operation, is compressed and, when compressed, is secured with the one spring sleeve and the force compressing the spring sleeve is then released causing the spring sleeve to partially re-expand and pull the helices of the other spring sleeve apart, thereby providing a joint having a plurality of spring sleeves with spaces between the adjacent helices of each spring sleeve.

An additional object of the present invention is the provision of a method of assembly of a plurality of spring sleeves into end cap members wherein each of the spring sleeves comprises a plurality of individual coil springs, wherein one of the spring sleeves is wound with the adjacent coils thereof in slight axial spaced relationship, while another spring sleeve has axial spaces greater than the spaces between the coils of the one sleeve, and wherein the ends of the spring sleeves are press-fit into recesses in end cap members and wherein the press-fitting is accomplished by compressing the spring sleeves to an equal length and moving the spring sleeves as a unit together into suitable channels in end cap members to press-fit the spring sleeves in the end cap members and releasing the pressure compressing the spring sleeves and permitting the other spring sleeve to partially re-expand and pull the one spring sleeve apart so that the coils thereof have axial spaces therebetween.

Yet another object of the present invention is the provision of a new and improved universal joint comprising a plurality of spring sleeve members each including a plurality of spring members, as noted in the preceding paragraph, wherein the compression of the other spring sleeve causes circumferential shifting of the ends of the individual springs thereof and wherein the ends of the springs are spaced so as to minimize or prevent hooking of the ends of the springs in the one sleeve on the ends of the springs in the other sleeve.

A still further object of the present invention is the provision of a new and improved method of assembling spring sleeves together wherein the springs are press-fit into suitable channels in an end cap member and wherein the ends of the spring sleeves are flattened so as to provide enlarged portions thereon which embed in the end cap member and provide an extremely good press-fit connection between the spring members and the end cap member.

Further objects and advantages of the present invention will be apparent to those skilled in the art to which it relates from the following detailed description of a preferred embodiment thereof made with reference to the accompanying drawings forming a part of this specification and in which.

The present invention relates to universal joints of the spring type used to transmit torque in opposite directions between driving and driven members. Primarily, such joints are used in vehicles and are associated with the drive shaft thereof. Often two universal joints are used at opposite ends of the drive shaft, namely, at the front and rear ends thereof. As is well known, however, these joints may be used in any environment to allow for universal pivotal movement of the driving and driven members relative to each other, as well as transmit torque therebetween.

Referring now specifically to the drawings, the preferred embodiment of the present invention comprises a universal joint 5 of the spring type for use in association with a drive shaft 6 of an automobile. The universal joint 5 illustrated in the drawings is a front end joint and transmits torque from the transmission of the automobile, not shown, to the drive shaft 6. The joint 5 comprises a driving means 7 operatively connected to the transmission to be driven thereby, a driven means 8 adapted to be connected to the drive shaft 6, and spring means 9 connected to the driving and driven means for transmitting torque therebetween in opposite directions.

The driving means 7 includes a hollow shaft portion 12 splined internally, as shown at 13, which splined portion cooperates with a driving member, not shown, driven from the transmission. The driving means 7 also includes a radially extending flange or end cap portion 14 formed integrally with the hollow shaft portion 12 and connected thereto at the end thereof remote from the transmission. The end cap portion 14 of the driving means 7 has an annular extending channel recess 14a therein concentric with the axis of the shaft portion 12 and intersecting the surface 15 of the end cap portion 14, which surface faces axially and toward the drive shaft 6.

The driven means 8 includes a shaft connecting portion 16 suitably fixedly connected to the drive shaft 6, and an end cap portion 17 having an annular extending recess 18 therein which is concentric with the axis of the drive shaft 6 and which intersects the surface 19 of the end cap portion 17, which surface faces axially toward surface 15 of the end cap portion 14 of the driving means 7. The recesses 14a and 18 have substantially the same radial extent and axial depth, however, the recess 18 is located radially inwardly of the recess 14a, for a purpose which will be apparent from the description hereinbelow.

The spring means 9 which transmits torque from the driving means 7 to the driven means 8 comprises a plurality of spring sleeves 20, 21, and 22. The spring sleeves extend coaxially and are nested or telescoped together with the spring sleeve 20 being the inner sleeve, the spring sleeve 21 being the intermediate sleeve, and the spring sleeve 22 being the outer sleeve. The opposite ends of each of the spring sleeves are suitably connected to the end cap portions 14, 17 of the driving and driven members, respectively, so as to transmit torque therebetween. As viewed in FIG. 1, the left end portion of the spring sleeves 20, 21, and 22 are positioned in the recess 14a, while the right end portions of the spring sleeves are positioned in the recess 18. These end portions of the spring sleeves 20, 21, and 22 are fixedly secured in the recesses 14a and 18, as will be described hereinbelow.

The universal joint 5 further preferably includes a ball and tube construction 30 which supports the driving and driven means for universal relative pivotal movement therebetween and also allows for longitudinal axial relative movement between the driving and driven means. The ball and tube construction 30 comprises an axially extending tubular member 31 connected by an annular portion 32 with the end cap portion 14 of the driving means 7. The tubular member 31 has an axially extending passageway 33 therein.

The ball and tube construction 30 further includes a suitable spherically-shaped ball member 35 connected to the end cap portion 17 of the driven means 8 by means of an axially extending portion 36. The ball member 35 is slidably received in the passageway 33 of the tubular member 31 and is movable axially therein and is pivotal in a universal manner therein. From the above description, it can be seen that the driving means 7 and driven means 8 can pivot relatively in a universal manner and, moreover, can move relatively in an axial direction.

The universal joint 5 also includes a sleevelike boot member 40 surrounding the spring sleeves 20, 21, 22. The boot member 40 functions to hold a suitable lubricant in a surrounding relation with the spring sleeves 20, 21, and 22, and the ball and tube construction 30. The boot member 40 is made of a suitable rubberlike yieldable material and has a bellows-like portion intermediate its ends. The opposite ends of the boot member 40 are secured to the driving and driven means by suitable clamp members 43, 44, respectively. The bellows construction thereof facilitates expansion and contraction of the boot member 40 in an axial direction upon relative movement of the driving and driven means in an axial direction. Moreover, the yieldable construction of the boot member 40 permits yielding thereof upon universal pivotal movement between the driving and driven members.

Figure 4:
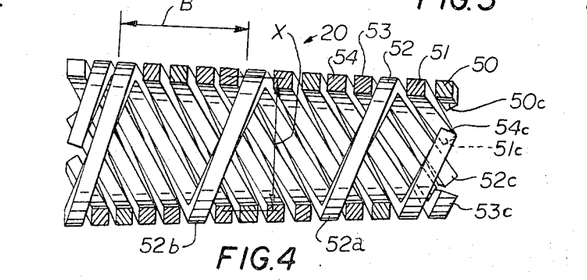
FIG. 4 is a sectional view, partly in elevation, of the inner spring sleeve before assembly into the universal joint of FIG. 1.

The spring sleeves 20, 21, and 22 transmit torque between the end cap portions 14 and 17, and each of the spring sleeves is constructed so as to provide a durable, long-lasting universal joint capable of effectively handling the loads of the magnitude encountered in a drive shaft of an automotive vehicle. Each of the spring sleeves 20, 21, and 22 is made up of a plurality of individual coil spring members of a particular construction and interrelated in a particular manner. The inner spring sleeve 20 may comprise four to six individual spring members and preferably comprises five individual springs 50–54. Each spring 50–54 is an open wound, left-hand spiral spring having coils or helices which are rectangular in cross section. The springs 50–54 are wound so that the coils or helices thereof are spaced an axial distance apart greater than the axial cross-sectional dimension of the coils of the other springs. For example, the adjacent coils 52a and 52b of the spring 52 have an axial distance therebetween greater than the axial dimensions of the cross sections of one coil of each of the springs 50, 51, 53, 54. The spring sleeve 20 is constructed by assembling the springs 50–54 so that the coils thereof are interdigitated and in an axially spaced relationship, as shown in FIG. 4. In view of the spiral shape of the spring members 50–54, the spring sleeve 20 is in the form of a tapered cylinder member having a truncated conical shape. Moreover, the ends of the individual springs 50–54, respectively, at the opposite ends of the spring sleeve 20 are not flush with the adjacent helix and thus provide axially projecting portions 50c–54c, the purpose of which will be described hereinbelow.

Each of the springs 50–54 comprising the inner spring sleeve 20 have a spring index within the range of 7–11 and, preferably, a spring index preferably about 8.8. The spring index, of course, equals the mean coil diameter divided by wire thickness measured radially. As shown in FIG. 4, the mean coil diameter is taken in the middle of the sleeve 20 and is designated X. The lead angle of the individual springs in the inner sleeve 20 should be within the range of 9–16° and, preferably, is about 13.8°. The preferred values for spring index and helix angle may vary somewhat for different length springs. The tan of the lead angle, of course, equals the axial pitch, designated B in FIG. 4, divided by Π times the mean coil diameter. The lead angle to some extent controls the size of the cross-over angle, designated C in FIG. 9. The cross-over angle is the angle that the coils of one sleeve make with the coils of the adjacent sleeve when they cross. This angle, of course, depends on the lead angle of the springs in the sleeves. Moreover, as described hereinabove, the inner spring sleeve comprises five, open wound, coil springs 50–54. However, the inner spring sleeve may comprise four to six open wound spring members. The spring index falling within the range of 7–11 and having a helix angle of 9–16° and utilizing a number of starts of 4–6, provides a coil spring sleeve which is extremely capable of handling the loads in an automotive drive line without buckling and localized stresses on the individual springs in the sleeve.

The intermediate spring sleeve 21 is preferably made up of five individual, right-hand, open wound, spiral spring members 60–64, having coils which are rectangular in cross section. The adjacent coils of the spring members 60–64 are spaced apart in an axial direction a distance greater than the sum of the axial dimensions of the cross section of the coils of the other springs in the spring sleeve 21. For example, coil 62a of spring 62 is spaced from coil 62b thereof a distance greater than the axial dimensions of the cross section of a coil of the other spring members, namely, greater than the axial cross-sectional dimension of a coil of the springs 60, 61, 63, 64. The spring sleeve 21 is provided by assembling the springs 60–64 such that the coils of the individual springs are interdigitated and in an axially spaced relationship. Therefore, the spring sleeve 21 is in the form of a tapered cylinder member or truncated cone. The ends of the individual springs 60–64, respectively, at the opposite ends of the spring unit 21 are not flush with the adjacent coil and thus provide axially projecting portions 60c–64c, the purpose of which will be described hereinbelow.

The individual coil springs 60–64 forming the middle spring sleeve 21 prior to assembly are preferably constructed so as to provide a strong universal joint having a long life. Hereinabove, it was noted that the spring sleeve 21, preferably, comprises five individual coil springs. The number of coil springs utilized in the spring sleeve 21 may be four to six, inclusive. The helix or lead angle of the individual coil springs is preferably about 9.2°, while the lead angle may fall within the range of 6–12°. The spring index, namely, the mean coil diameter divided by the radial extent of the wire forming the individual coils, is preferably about 10.6 for the individual springs, while the spring index may lie in the range of 9–13. The preferable lead angle and spring index will vary slightly from that given above for different length springs.

The outer spring sleeve 22 is preferably made up of six individual, open wound, left-hand, spiral coil springs 70–75 having coils of uniform circular cross section. The individual coils of the open wound coil springs 70–75 are spaced axially apart a distance greater than the sum of the axial cross-sectional dimension of the five other spring members. For example, the distance between cross section 70a and 70b of the spring 70 is a distance greater than the sum of the axial cross-sectional dimensions of a coil of each of the other springs in the sleeve. The spring sleeve 22 is provided by assembling the springs 70–75 in an interdigitated axially spaced relation and is in the form of a tapered cylinder member or of a truncated cone. The ends of the individual springs 70–75 at the opposite ends of the spring sleeve 22 are not flush with the adjacent helix and thus provide axially projecting portions 70c–75c, the purpose of which will be described hereinbelow. Moreover, since the individual coil springs 70–75 are arcuate or circular in cross section, the outermost circumferential portions thereof provide axially spaced, radially projecting portions 76, the purpose of which will also be described hereinbelow.

While the description hereinabove states that the outermost spring sleeve is preferably comprised of six individual coil springs, the outermost spring sleeve 22 may comprise five to seven individual coil springs. The lead or helix angle of the individual coil springs, prior to assembly, is about 9.5°, while the helix angle may lie within the range of 6–12°. Moreover, the spring index of the springs forming the outermost spring sleeve is preferably about 12.5, while it may lie within the range of 11–15, inclusive. The preferred values for the spring index and lead angles change slightly for different length springs.

The spring sleeves 20, 21, 22 are secured to the driving and driven members to provide a complete universal joint. The opposite ends of the spring sleeves 20, 21, and 22 are connected to the driving and driven members in an extremely reliable and durable manner, and specifically are press-fitted into the recesses 14a and 18 of the driving and driven members, respectively, and thus provide a press-fit connection therebetween. This press-fit is effected by cold-pressing the spring sleeves into the recesses by moving the spring sleeves and driving and driven members relatively under pressure. The connection of the spring sleeves with the driving and driven members and the cooperative relationship between the spring sleeves and recesses 14a and 18 are identical and thus only the connection of the spring means 9 with the driven member 8 will be described in detail hereinbelow.

As noted above, the ends of the spring sleeves are press-fitted in the recess 18. The radial extent or width of the spring sleeves is substantially greater than the corresponding dimension, namely, the width or radial extent of the recess 18. The difference in the width of the spring sleeves and the corresponding dimension of the recess 18 is termed hereinbelow as the "interference" between the spring sleeves and the recess. This interference is substantially in excess of that which is normal in press-fit practice and is substantially greater than that which is recommended by the well-known mechanical engineering texts.

The interference preferably is of such a degree as to provide a so-called clamp fit. In the present example, the annular recess 18 is .010 to .030 inch narrower than the thickness of the assembled spring sleeves which fit therein. For example, each groove or recess has a width approximately .536 inch plus or minus suitable tolerance, and the spring sleeves have a width of .551 to .566 inch. The interference represents dimensionally 1.7 to 5.4 percent of the radial extent of the spring sleeves. Such a percentage of interference is greatly in excess of that recommended by Mark's Handbook even for shrink fits.

Due to the extremely great amount of interference between the spring means 9 and the recess 18, when the spring sleeves are inserted into the recess 18, the outer portion 80 of the end cap 17 is greatly tensioned and as the spring sleeves move toward the bottom of the recess 18, the entire end cap is tensioned, even the base portion thereof. As a result, the end cap applies a tight clamping pressure on the spring means 9 and tightly secures the spring means 9 in the recess 18 and this provides an extremely reliable and high-torque transmitting press-fit connection between the spring sleeves and the end cap portion of the drive members. As the spring means 9 is inserted in the recess 18 therein, a wedging action between the spring means and the walls of the recess takes place and the portion of the driving member at the base of the recess which is in tension applies an extremely great clamping pressure on the spring means and the walls of the recess 18 diverge. In view of this, particularly high-torque transmitting capacity is achieved by inserting the spring means 9 all the way into the recess or bottoming the spring means 9 in the recess 18.

Preferably, the hardness of the end caps is controlled within narrow limits and by maintaining the end caps at a lower hardness than that of the spring sleeves, even higher torque capacities are attained. By maintaining the end caps at a lower hardness than the spring sleeves, a mechanical interfitting of portions of the spring sleeves and the end cap is obtained which provides a direct and positive transmission of the torque from the end cap to the spring members in addition to the frictional gripping provided by the pressfit described above.

With the end cap at a lower hardness than the spring sleeves as the spring sleeves are inserted into the recess 18, the projecting portions 50c to 54c, 60c to 64c, and 70c to 75c are forced or embedded into the bottom surface of the recess 18. These portions of the spring sleeves which are embedded in the bottom of the recess 18 provide for a mechanical interlocking or interfitting of the spring sleeves with the end caps and provide for a positive transmission of torque therebetween. The end caps as a result of the embedding of the projecting portions of the springs thereinto, are provided with a plurality of grooves or step-like recesses in the bottom of the recesses which receive the projecting portions 50c to 54c, 60c to 64c, and 70c to 75c, respectively, of the springs. The grooves which receive the ends 70c to 75c are shown in FIG. 10 and designated 70d to 75d.

Moreover, because of the difference in the hardness of the springs and driven member, the clamping pressure acting radially on the spring sleeves and tending to clamp the spring sleeves in the recess 18 causes embedding of the projecting portions 76 and the spring sleeve 22 in the end cap and causes masses of material 81 to form between the adjacent coils of the outer spring sleeve 22 and, specifically, between the projecting portions 76 of the outer spring sleeve. Embedding of the portions 76 provides indentations in which the coils are received. The indentations receiving the projecting portions 76 of the springs in the spring sleeves prevent, to some extent, the spring sleeve from moving axially out of the recess 18, as well as provide a large area of frictional and mechanical engagement between the coils of the springs and the driven member and thereby provide a high-torque capacity, frictional and mechanical grip.

Figures 5, 6, 7, 8, 9, 10, 11:
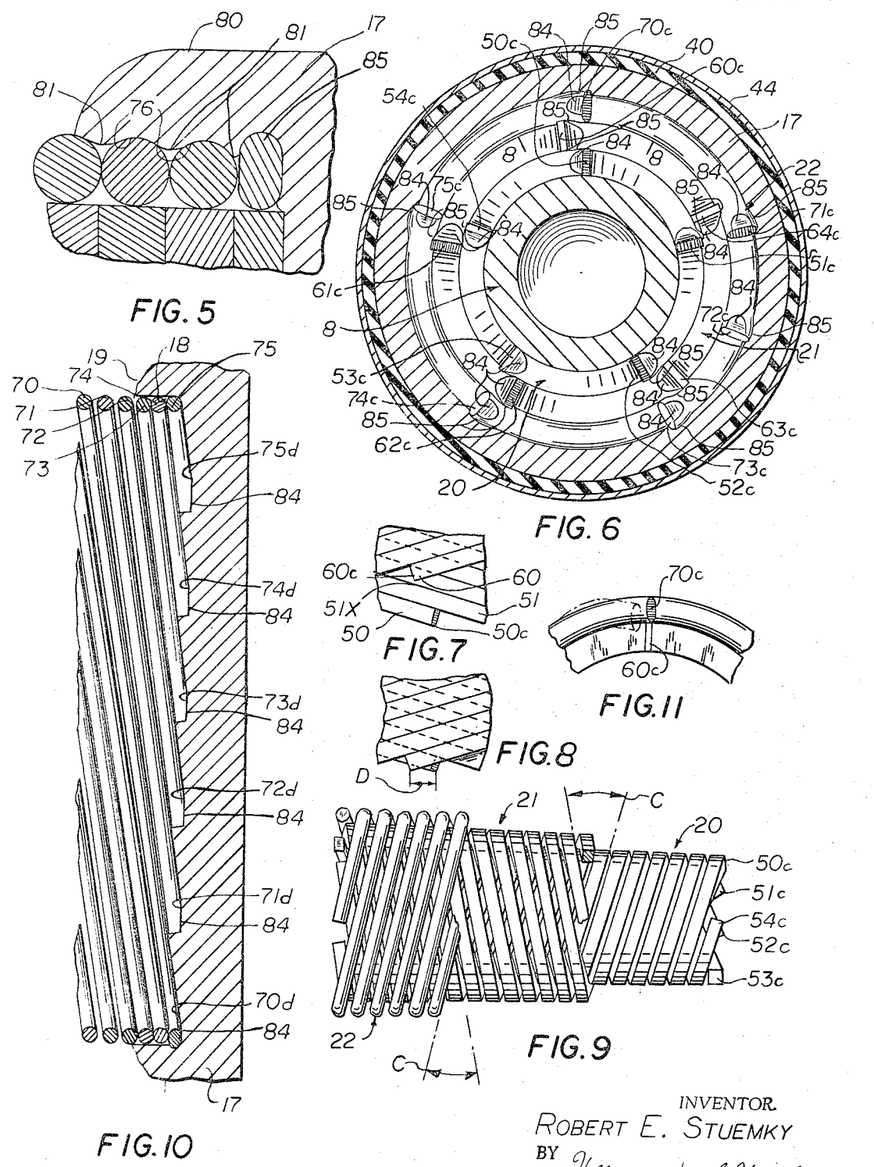
FIG. 5 is a fragmentary sectional view, on an enlarged scale, of a portion of the universal joint shown in FIG. 1.
FIG. 6 is a transverse cross-sectional view of the universal joint shown in FIG. 1, taken approximately along the section line 6—6 of FIG. 1.
FIG. 7 is a view illustrating portion of the universal joint during the assembly thereof.
FIG. 8 is a cross-sectional view taken approximately along the section line 8—8 of FIG. 6.
FIG. 9 is a fragmentary view of a portion of the universal joint of FIG. 1 with parts broken away.
FIG. 10 is a sectional developed view of a portion of the universal joint shown in FIG. 1.
FIG. 11 is a schematic view illustrating a portion of the universal joint shown in FIG. 1.

As best shown in FIG. 5, the massing of the material is such as to provide different depth indentations from the open end of the recess to the bottom thereof. The massing of the material is greater at the bottom portion of the recess and, therefore, the indentation adjacent to the bottom of the recess 18 is deeper than the other indentations and the amount of material massed between the helices is greater from the open end of the recess to the bottom thereof. In other words, the massing of the material becomes progressively less from the bottom of the recess 18 to the outer or open end thereof.

It should be apparent from the above description that, while the end caps are of a slightly less hardness than the spring units, the end caps cannot be too hard since the spring units will not be embedded into the end caps if they are to hard, but merely will tend to slide over the surface thereof and attain only a frictional hold therebetween. Of course, if the end cap is too soft relative to the spring units, the spring units will cut the material of the end caps and actually will shave the end caps and thus remove material therefrom and enlarge the recess 18. The relative hardness of the spring and end caps can readily be determined by those skilled in the art and for any given hardness of springs, the most desirable end cap hardness can be selected. Preferably, a hardness of 40–50 Rc (Rockwell) for the springs and a hardness of 240–300 Brinnell (3,000 lb. load) for the end caps had been found acceptable.

The ends of the spring sleeves 20, 21, 22 in order to provide a highly effective press-fit are "coined," that is, flattened somewhat, as shown at 84, to provide enlarged portions 85 on the ends of the springs forming the spring sleeves. This coining operation is performed prior to assembly of the springs in the end caps and is performed by striking the ends of the spring sleeves with a very hard coining tool. The enlarged portions, best shown in FIG. 6, provide an effective press-fit because of their great radial extent and extend into the clamping portion of the end cap members a distance greater than the other portions of the spring coils.

From the above description, it should be readily apparent that the present invention provides a universal joint wherein the spring sleeves are securely gripped and held in the recesses in the end cap portions of the driving and driven members to provide an extremely high-torque transmitting capability. This high-torque transmitting capability is provided by the clamp fit between the end cap portions and the spring sleeves wherein the end cap portions of the driving and driven members are placed in tension substantially throughout so as to provide an extremely great frictional and mechanical gripping engagement with the spring means 9. Moreover, due to the hardness differences between the end cap portions and the springs, the bases of the recesses are indented by the axially projecting portions of the springs to provide a mechanical interconnection therebetween and the radial outermost surface of the recesses are provided with grooves or indentations which secure the spring sleeves against axial movement out of the end cap and provide for a large area of frictional contact between the outermost spring sleeve and the end cap. These factors, as outlined hereinabove, provide for a high-torque transmitting capacity and provide a greatly improved universal joint.

Figure 1:
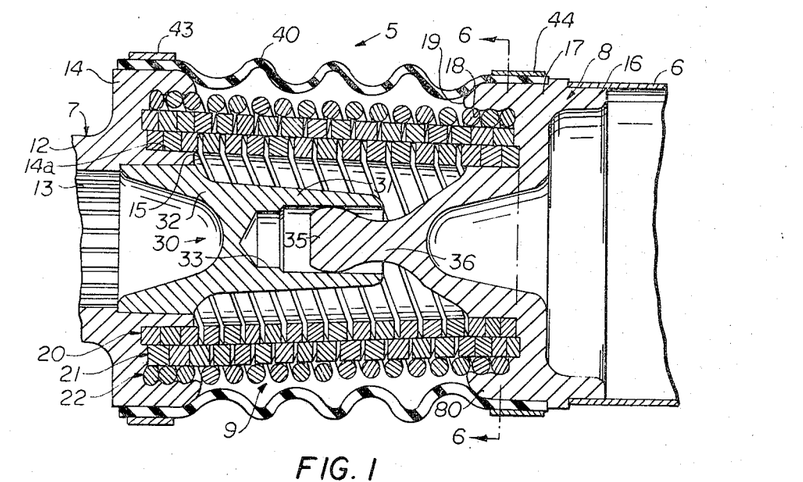
FIG. 1 is an axial cross-sectional view of a universal joint embodying the present invention and having three telescoped spring sleeves.
Figure 2:
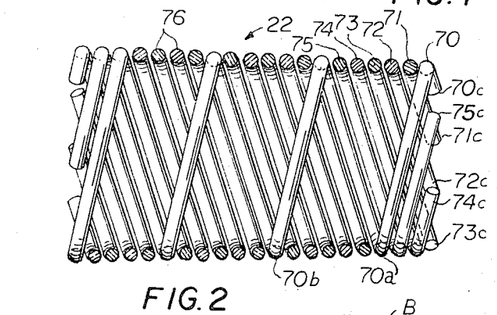
FIG. 2 is a sectional view, partly in elevation, of the outer spring sleeve before assembly in the universal joint of FIG. 1.
Figure 3:
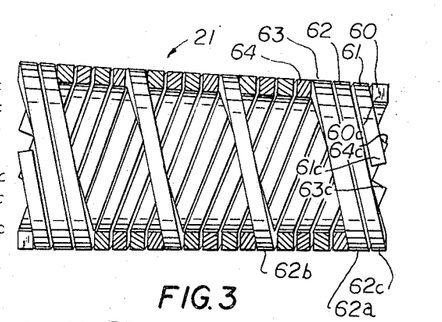
FIG. 3 is a sectional view, partly in elevation, of the intermediate spring sleeve before assembly into the universal joint of FIG. 1.
Figures 12, 13, 14, 15, 16, 17, 18, 19:
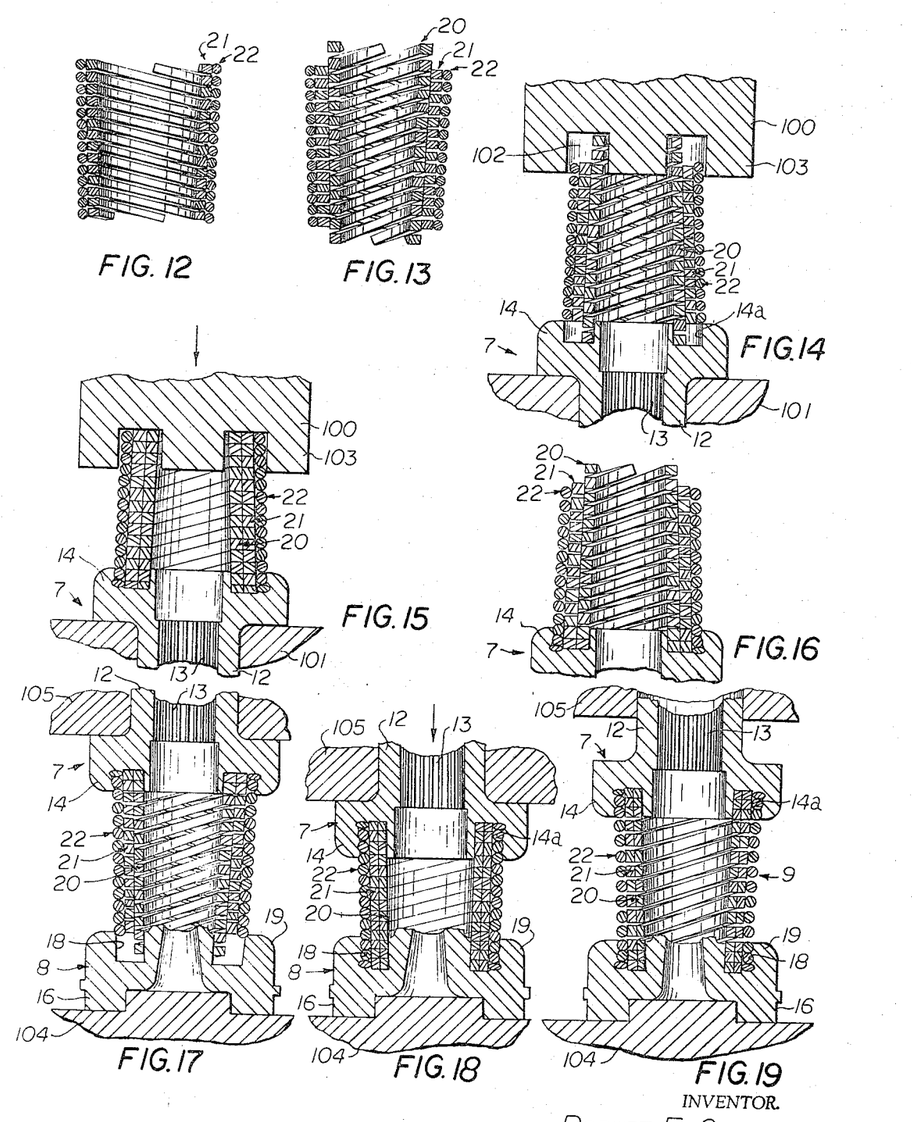
FIGS. 12–19 are schematic sectional views illustrating different steps in the method of assembling the universal joint shown in FIG. 1.

The method of assembling the universal joint shown in FIG. 1 is illustrated schematically in FIGS. 12–19. Springs forming the outermost coil spring sleeve 22 are assembled together in interdigitated fashion. The springs forming the intermediate spring sleeve 21 are also assembled together. The inner diameter of the sleeve 22 has an interference fit with the outer diameter of the sleeve 21 and is forced thereinto and in radial pressure engagement, as shown in FIG. 12. The lengths of the spring sleeves 21 and 22 are substantially identical and the adjacent helices are in an axial spaced relation and a radial abutting relation.

The inner spring sleeve 20 is then inserted into the intermediate spring sleeve 21. The outer diameter of the springs forming the spring sleeve 20 is slightly greater than the inner diameter of the springs forming the spring sleeve 21 so that the spring sleeves 20, 21 have a radial pressure interference fit. Since the spring sleeve 20 is formed of coiled springs wherein the adjacent helices of each coil are spaced a distance greater than the thickness of the coils of all of the other springs together, the spring sleeve 20 has axial spaces between the adjacent helices and in view of the greater helix angle of the springs forming the sleeve, is somewhat greater in length and extends somewhat beyond the opposite ends of the spring sleeves 22 and 21, as shown in FIG. 13.

The assembled spring sleeves are then positioned with one end thereof, namely, the large diameter end, in alignment with the recess 14a in the driving member 7 with the member 7 positioned between upper and lower die members 100, 101. The projecting end portions of the inner spring sleeve are located within the recess 14a of the driving member, as shown in FIG. 14. The die members 100 and 101 are then moved relatively to the position shown in FIG. 15 wherein the spring sleeves are press-fitted into the recess 14a, in which position, the spring sleeves are compressed to the same length. To facilitate this press-fitting, the upper die 101 has an annular recess 102 which loosely receives the upper ends of the spring sleeves 20, 21, 22. The die member 101 also has a guide or shroud portion 103 which encircles the outermost sleeve 22 at the upper end thereof so as to prevent buckling of the sleeves under the compressive force and to insure proper press-fitting.

After the one end of the spring sleeves 20, 21, 22 are press-fit into the recess 14a, the dies 100 and 101 move relatively apart. This releases the compressive forces holding the helixes of the springs in axial abutment, and the spring sleeves 20, 21, 22 tend to re-expand somewhat, as shown in FIG. 16, with the length of the inner spring sleeve 20 being slightly greater than the other spring sleeves. The assemblage of the spring sleeves with the member 7 is then inverted from the position shown in FIG. 16 and the ends of the spring sleeves are aligned with the recess 18 in the driven member 8.

The driven member 8 is supported on a die member 104, while a die member 105 engages the driving member 7. The die members 104, 105 are moved relatively together causing the spring sleeves to be compressed to the position shown in FIG. 18 and press-fitting the sleeves in the recess 18.

After the spring sleeves have been press-fit into the recess 18, the dies 104 and 105 are moved relatively apart. Upon the relative outward movement of the die members 104, 105, the spring sleeve 20 tends to expand from its compressed condition and return to the position it originally had. In expanding, the spring sleeve 20 forces the member 7, as viewed in FIG. 19, away from the member 8. The upward movement of the member 7 causes the spring sleeves 21 and 22 also to be extended upwardly and, in fact, the force exerted on the member 7 by the spring sleeve 20 tending to return to its original position is sufficient to extend the spring sleeves 21 and 22 to the position shown in FIG. 19 wherein the spring sleeves 21 and 22 are provided with axial spaces between the axially adjacent coils or helices thereof which are greater than the size of the original axial spaces therebetween. Thus, the spring sleeves 21, 22 are in tension, while spring sleeve 20 is in compression. It should be noted that the spring sleeve 20 is not sufficiently strong to expand the spring sleeves 21 and 22 to the original position of the spring sleeve, therefore, the axial spaces between adjacent coils of the spring sleeve 20 are not as great after the press-fit operation as the spaces were prior to the press-fit operation and, therefore, the extent of the spring sleeve 20 is less than its original extent.

On stretching of the spring sleeves 21 and 22, these spring sleeves contract somewhat radially and in combination with the radial expansion of the spring sleeve 20, as effected by the compression thereof from its original position, effect a greater radial interfitting engagement between the spring sleeves holding the coils thereof in a tight radial engagement and maintain this radial engagement between the spring sleeves even when transmitting torque therebetween.

The individual springs forming the spring sleeves 20, 21, and 22 are indexed with respect to each other, in the preferred embodiment, so that the ends thereof are spaced from the ends of the springs in the radially adjacent spring sleeves a distance so as to minimize the snagging of the coils in one spring sleeve on the coils of the spring sleeves in the next radially adjacent spring sleeve upon assembly of the spring sleeves. This spacing is best shown in FIG. 6 wherein it can be readily seen that the ends of the springs in the inner and intermediate sleeves lie on the circumference of a circle and are equally spaced therearound. Moreover, as viewed in FIG. 8, the end of the springs in the inner spring sleeve are spaced from the adjacent spring of the middle spring a slight amount, designated D. This spacing prevents snagging of ends of the springs in one sleeve on the coils of the springs in another adjacent spring sleeve. This overlapping is such that the distance between the ends of the adjacent springs is not substantially greater than twice the thickness of the wire comprising the springs and, preferably, is substantially equal to the thickness of a coil of the spring. This has been found to facilitate the entry of the springs into the recesses in the spring sleeves as well as minimize the snagging of the springs on the radially adjacent helices.

This can be readily appreciated from viewing FIGS. 7 and 8. In FIG. 7, the spring sleeves 20, 21 are shown in a position during assembly thereof into telescoping relation. The end 60c of the spring 60 is illustrated in a position which it would have while it was being assembled with the spring sleeve 20. The end 60c of the spring 60 is shown above the end 50c of the spring 50. As the spring 60 moves downwardly relative to the spring 50, the end 60c tends to engage the portion 51x of the spring 51 and snag the spring 51. By spacing the ends 60c and 50c of the springs 60 and 50 in the positions shown, and in an overlapping relation, substantial resistance is provided to snagging which minimizes snagging of the spring 60c on the helix 51 and aids the spring 60 to slide over the springs in the adjacent spring sleeve and down into the position illustrated in FIG. 8. This positioning of the ends of the springs in this manner so as to minimize snagging is clearly shown in FIG. 6 wherein the ends of the springs forming the spring sleeve 21 are in an overlapping relation with respect to the ends of the springs forming the springs of the inner coil 20 and are overlapped approximately the thickness of the spring wire or the distance designated D in FIG. 8.

The relative positioning of the ends of the springs forming the outermost spring sleeve 22 is also important in order to provide for efficient assembly of the spring sleeves. The ends should be positioned as shown in FIG. 6 wherein the ends of the springs forming the outermost spring sleeve 22 overlap the ends of the springs forming the middle spring 21. When the outermost coil sleeve 22 expands during the assembly of the joint, the springs forming the sleeve increase in diameter causing a circumferential shifting of the ends of the springs in the sleeve 22. If the ends of the springs are not spaced adequately with respect to the ends of the springs in the middle spring sleeve 21, the ends of the springs in the outermost spring sleeve will hook, as illustrated in FIG. 11, against the ends of the middle spring sleeve when the compressive force is removed after installing the first end cap, resulting in a circumferential reshifting of the outer and middle coils relative to each other. As shown in FIG. 11, and the end 70c of the spring 70 moves from the full-line position to the dot-dash position due to this circumferential shifting. When the relative spacing of the end 70c and the end 60c is as shown in FIG. 11, the end 70c shifts circumferentially when the sleeve is compressed and moves beyond the end 60c of the spring 60 in the direction of the arrow, and the end 70c hooks the coil of the spring 60. It can be seen, therefore, that the ends of the spring forming the outer spring sleeve must overlap the ends of the springs of the middle spring sleeve sufficiently to prevent this hooking. Overlapping the ends of the outer spring sleeve a distance equal to one to two times the diameter thereof from the ends of the springs in the middle spring sleeve has been found to be sufficient.

The particular positioning of the ends of the springs in the individual sleeves, as shown in the drawings, is such that the ends of the springs are located within an area substantially equal to twice the thickness of the wire forming the springs. This maintains all of the ends of the springs within a certain predetermined area and provides for a full interference fit at the bottom of the grooves 18 and 14a in the end cap members when they are inserted therein. This full interference fit is provided due to the fact that the ends of the springs are located substantially closely together and, therefore, bottom into the end caps at substantially the same area to provide a tight radial press-fit relationship. Since the number of coils or springs forming the outermost spring sleeve is greater than that forming the inner spring sleeves by one, there is, therefore, one extra and designated 71d in FIG. 6. This particular end may be positioned anywhere with respect to the others and is shown in FIG. 6 as located intermediate two of the other coils.

From the above description, it should be readily apparent that the preferred embodiment of the present invention has been described in great detail and that certain modifications, adaptations, and changes therein may be made by those skilled in the art to which it relates, and it is hereby intended to cover all such changes, adaptations, and modifications falling within the scope of the appended claims.

What is claimed is:

1. A drive mechanism to be positioned between driving and driven members to transmit torque therebetween and permit relative movement therebetween due to external forces acting thereon comprising at least two coil spring sleeves adapted to be connected between said driving and driven members, each coil spring sleeve having a predetermined axial extent in the absence of external forces acting thereon and including a plurality of coil spring members having the coils thereof interdigitated, the coil springs of one sleeve being wound in one direction and the coil springs of the other sleeve being wound in the reverse direction, said sleeves having a nested telescoped relation with coils thereof in radial pressure contact throughout their circumference, and the axially adjacent coils of each sleeve having spaces therebetween at least when said sleeves are at said predetermined axial extent and which spaces extend completely circumferentially around the sleeve.

2. A drive mechanism comprising driving and driven members normally spaced a predetermined distance apart and movable therefrom relatively due to external forces acting thereon, spring means connected between said driving and driven members to transmit torque therebetween and provide for relative movement therebetween, said spring means comprising at least two coil spring sleeves having a pretedmined axial extent when said driving and driven members are in their normal spacing, each of said spring sleeves including a plurality of coil spring members having the coils thereof interdigitated, the coil springs of one sleeve being wound in one direction and the coil springs of the other sleeve being wound in the reverse direction, said sleeves having a nested telescoped relation with the coils thereof in radial pressure contact, the adjacent coils of each sleeve being axially spaced with respect to each other when said driving and driven members are at said normal spacing, and one of said coil spring sleeves being in compression and another being in tension.

3. A drive mechanism as defined in claim 1 wherein said radial pressure contact and the configuration of said spring sleeves cooperate to limit axial movement of the individual coils of the springs of said sleeves.

4. A drive mechanism comprising, driving and driven members normally spaced a predetermined distance apart and movable therefrom relatively due to external forces acting thereon, spring means connected between said driving and driven members to transmit torque therebetween and provide for relative movement therebetween, said spring means comprising at least two coil spring sleeves having a predetermined axial extent when said driving and driven members are in their normal spacing, each of said spring sleeves including a plurality of coil spring members having the coils thereof interdigitated, the coil springs of one sleeve being wound in one direction and the coil springs of the other sleeve being wound in the reverse direction, said sleeves having a nested telescoped relation with the coils thereof in radial pressure contact, the adjacent coils of each sleeve being axially spaced with respect to each other when said driving and driven members are at said normal spacing, and wherein the individual springs forming each of said coil spring sleeves have a spring index within the range of 7–15, a lead angle within the range of 6–16° and with the number of springs in each of said sleeves being within the range of 4–7.

5. A drive mechanism comprising driving and driven members normally spaced a predetermined distance apart and movable therefrom relatively due to external forces acting thereon, spring means connected between said driving and driven members to transmit torque therebetween and provide for relative movement therebetween, said spring means comprising three coil spring sleeves having a predetermined axial extent when said driving and driven members are in their normal spacing, each of said spring sleeves including a plurality of coil springs having the coils thereof interdigitated, said sleeves having a nested telescoped relation with the outer diameter of the coils of the innermost sleeve in radial pressure contact with the inner diameter of the coils of the intermediate sleeve and the outer diameter of the coils of the intermediate sleeve in radial pressure contact with the inner diameter of the coils of the outer sleeve, the coil springs forming the inner and outer coil sleeves being wound in one direction and the coil springs forming the intermediate sleeve being wound in the reverse direction, the adjacent coils of each sleeve being axially spaced with respect to each other when said driving and driven members are at said normal spacing and wherein the individual spring members of said inner spring sleeve prior to assembly thereto have a lead angle within the range of 9–16° and the individual coil spring members of the intermediate spring sleeve prior to assembly have a lead angle of 6–12° and the individual spring members of the outer spring sleeve prior to assembly have a lead angle of 6–12°.

6. A drive mechanism comprising driving and driven members normally spaced a predetermined distance apart and movable therefrom relatively due to external forces acting thereon, spring means connected between said driving and driven members to transmit torque therebetween and provide for relative movement therebetween, said spring means comprising three coil spring sleeves having a predetermined axial extent when said driving and driven members are in their normal spacing, each of said spring sleeves including a plurality of coil springs having the coils thereof interdigitated, said sleeves having a nested telescoped relation with the outer diameter of the coils of the innermost sleeve in radial pressure contact with the inner diameter of the coils of the intermediate sleeve and the outer diameter of the coils of the intermediate sleeve in radial pressure contact with the inner diameter of the coils of the outer sleeve, the coil springs forming the inner and outer coil sleeves being wound in one direction and the coil springs forming the intermediate sleeve being wound in the reverse direction, the adjacent coils of each sleeve being axially spaced with respect to each other when said driving and driven members are at said normal spacing, and wherein the individual coil spring members forming the inner coil sleeve have a spring index within the range of 7–11, the individual coil spring members forming the intermediate spring sleeve have a spring index within the range of 9–13, and the individual coil spring members of the outer sleeve have a spring index within the range of 11–15.

7. A drive mechanism comprising driving and driven members normally spaced a predetermined distance apart and movable therefrom relatively due to external forces acting thereon, spring means connected between said driving and driven members to transmit torque therebetween and provide for relative movement therebetween, said spring means comprising three coil spring sleeves having a predetermined axial extent when said driving and driven members are in their normal spacing, each of said spring sleeves including a plurality of coil springs having the coils thereof interdigitated, said sleeves having a nested telescoped relation with the outer diameter of the coils of the innermost sleeve in radial pressure contact with the inner diameter of the coils of the intermediate sleeve and the outer diameter of the coils of the intermediate sleeve in radial pressure contact with the inner diameter of the coils of the outer sleeve, the coil springs forming the inner and outer coil sleeves being wound in one direction and the coil springs forming the intermediate sleeve being wound in the reverse direction, the adjacent coils of each sleeve being axially spaced with respect to each other when said driving and driven members are at said normal spacing, and wherein the individual coil spring members of said inner spring sleeve have a spring index within the range of 7–11, and a lead angle within the range of 9–16°, the individual coil spring members forming the middle spring sleeve have a spring index within the range of 9–13 and a lead angle within the range of 6–12°, and the individual coil springs of the outer spring sleeve have a spring index within the range of 11–15 and a lead angle within the range of 6–12°.

8. A drive mechanism comprising driving and driven members normally spaced a predetermined distance apart and movable therefrom relatively due to external forces acting thereon, spring means connected between said driving and driven members to transmit torque therebetween and provide for relative movement therebetween, said spring means comprising three coil spring sleeves having a predetermined axial extent when said driving and driven members are in their normal spacing, each of said spring sleeves including a plurality of coil springs having the coils thereof interdigitated, said sleeves having a nested telescoped relation with their outer diameter of the coils of the innermost sleeve in radial pressure contact with the inner diameter of the coils of the intermediate sleeve and the outer diameter of the coils of the intermediate sleeve in radial pressure contact with the inner diameter of the coils of the outer sleeve, the coil springs forming the inner and outer coil sleeves being wound in one direction and the coil springs forming the intermediate sleeve being wound in the reverse direction, the adjacent coils of each sleeve being axially spaced with respect to each other when said driving and driven members are at said normal spacing, and wherein said inner spring sleeve is made up of 4–6 individual spring members having a spring index within the range of 7–11, the intermediate coil sleeve is made up of 4–6 individual spring members having a spring index within the range of 9–13, and the outer coil sleeve being made up of 5–7 individual coil springs having a spring index within the range of 11–15.

9. A drive mechanism comprising driving and driven members normally spaced a predetermined distance apart and movable therefrom relatively due to external forces acting thereon, spring means connected between said driving and driven members to transmit torque therebetween and provide for relative movement therebetween, said spring means comprising three coil spring sleeves having a predetermined axial extent when said driving and driven members are in their normal spacing, each of said spring sleeves including a plurality of coil springs having the coils thereof interdigitated, said sleeves having a nested telescoped relation with the outer diameter of the coils of the innermost sleeve in radial pressure contact with the inner diameter of the coils of the intermediate sleeve and the outer diameter of the coils of the intermediate sleeve in radial pressure contact with the inner diameter of the coils of the outer sleeve, the coil springs forming the inner and outer coil sleeves being wound in one direction and the coil springs forming the intermediate sleeve being wound in the reverse direction, the adjacent coils of each sleeve being axially spaced with respect to each other when said driving and driven members are at said normal spacing, and wherein the inner coil sleeve is made up of 4–6 individual coil spring members having a spring index of 7–11 and a lead angle of 9–16°, said intermediate spring sleeve being made up of 4–6 individual spring members having a spring index of 9–13 and a lead angle of 6–12°, and the outer coil sleeve being made up of 5–7 coil spring members having a spring index of 11–15 and a lead angle of 6–12°.

10. A drive mechanism comprising a driving member, a driven member, means interconnecting said driving and driven members to transmit torque therebetween including at least two coil spring sleeves, each coil spring sleeve including a plurality of coil spring members having the coils thereof interdigitated, the coil springs of one sleeve being wound in one direction and the coil springs of the other sleeve being wound in the reverse direction, said sleeves having a nested telescoped relation, and the individual springs forming each of said coil spring sleeves having a spring index within the range of 7–15, a lead angle within the range of 6–16° and with the number of springs in each of said sleeves being within the range of 4–7.

11. A drive mechanism comprising a driving member, a driven member, means interconnecting said driving and driven members to transmit torque therebetween including three coil spring sleeves, each coil spring sleeve including a plurality of coil spring members having the coils thereof interdigitated, said coil spring sleeves having a nested telescoped relation with the inner spring sleeve positioned in the intermediate spring sleeve and the intermediate spring sleeve positioned in an outer spring sleeve, and the individual spring members of said inner spring sleeve have a lead angle within the range of 9–16° and the individual coil spring members of the middle spring sleeve have a lead angle of 6–12° and the individual spring members of the outer spring sleeve have a lead angle of 6–12°.

12. A drive mechanism comprising a driving member, a driven member, means interconnecting said driving and driven members to transmit torque therebetween including three coil spring sleeves, each coil spring sleeve including a plurality of coil spring members having the coils thereof interdigitated, said coil spring sleeves having a nested telescoped relation with the inner spring sleeve positioned in the intermediate spring sleeve and the intermediate spring sleeve positioned in the outer spring sleeve, the individual coil spring members forming the inner coil sleeve having a spring index within the range of 7–11, the individual spring members forming the intermediate spring sleeve having a spring index within the range of 9–13, and the individual coil spring members of the outer sleeve having a spring index within the range of 11–15.

13. A drive mechanism comprising a driving member, a driven member, means interconnecting said driving and driven members to transmit torque therebetween including three coil spring sleeves, each coil spring sleeve including a plurality of coil spring members having the coils thereof interdigitated, said coil spring sleeves having a nested telescoped relation with the inner spring sleeve positioned in the intermediate spring sleeve and the intermediate spring sleeve positioned in an outer spring sleeve, the individual coil spring members of the inner sleeve have a spring index within the range of 7–11, and a lead angle within the range of 9–16°, the individual coil spring members forming the intermediate spring sleeve have a spring index within the range of 9–13 and a lead angle within the range of 6–12°, and the individual coil springs of the outer spring sleeve have a spring index within the range of 11–15, and a lead angle within the range of 6–12°.

14. A drive mechanism comprising a driving member, a driven member, means interconnecting said driving and driven members to transmit torque therebetween including three coil spring sleeves, each coil spring sleeve including a plurality of coil spring members having the coils thereof interdigitated, said coil spring sleeves having a nested telescoped relation with the inner spring sleeve positioned in the intermediate spring sleeve and the intermediate spring sleeve positioned in an outer spring sleeve, and the inner spring sleeve is made up of 4–6 individual spring members having a spring index within the range of 7–11, the intermediate coil sleeve is made up of 4–6 individual spring members having a spring index within the range of 9–13, and the outer coil sleeve is made up of 5–7 individual coil springs having a spring index within the range of 11–15.

15. A drive mechanism comprising a driving member, a driven member, means interconnecting said driving and driven members to transmit torque therebetween including three coil spring sleeves, each coil spring sleeve including a plurality of coil spring members having the coils thereof interdigitated, said coil spring sleeves having a nested telescoped relation with the inner spring sleeve positioned in the intermediate spring sleeve and the intermediate spring sleeve positioned in the outer spring sleeve, and the inner coil sleeve is made up of 4–6 individual coil spring members having a spring index of 7–11 and a helix angle of 9–16°, the intermediate spring sleeve being made up of 4–6 individual spring members having a spring index of 9–13 and a helix angle of 6–12°, and the outer coil sleeve being made up of 5–7 coil spring members having a spring index of 11–15 and a helix angle of 6–12°.

16. A drive mechanism comprising a driving member, a driven member, means interconnecting said driving and driven members to transmit torque therebetween including three coil spring sleeves, each coil spring sleeve including a plurality of coil spring members having the coils thereof interdigitated, said coil spring sleeves having a nested telescoped relation with the inner spring sleeve positioned in the intermediate spring sleeve and the intermediate spring sleeve positioned in an outer spring sleeve, the coil springs of said outer and inner spring sleeves being wound in one direction and the coil springs of said intermediate spring sleeve being wound in the reverse direction, the number of coil spring members in said spring sleeves being within the range of 4–7, and wherein the spring members of the outer spring sleeve are formed from wire having a substantially circular cross section and the spring members of the inner and intermediate spring sleeves are formed of wire having a rectangular cross section.

17. A drive mechanism comprising a driving member, a driven member, means interconnecting said driving and driven members to transmit torque therebetween including three coil spring sleeves, each coil spring sleeve including a plurality of coil spring members having the coils thereof interdigitated, said coil spring sleeves having a nested telescoped relation with the inner spring sleeve positioned in the intermediate spring sleeve and the intermediate spring sleeve positioned in an outer spring sleeve, the coil springs of said outer and inner spring sleeves being wound in one direction and the coil springs of said intermediate spring sleeve being wound in the reverse direction, and the number of coil spring members in said spring sleeves being within the range of 4–7, said driving and driven members having recesses therein in which the opposite ends of said spring sleeves are positioned, said driving and driven members having a hardness less than said spring members, and said spring sleeves having a press-fit connection therein.

18. A drive mechanism as defined in claim 17 wherein the inner and intermediate spring sleeves have the same number of spring members therein and the ends of the spring members forming the inner and intermediate spring sleeves lie on concentric circles and are substantially equally spaced therearound, and the ends of the coil springs of the intermediate sleeve overlap the ends of the coil springs of the inner sleeve and are spaced angularly from the ends of the coil springs of the inner sleeve a distance less than twice the thickness of the wire forming the coils thereof.

19. A drive mechanism comprising a driving member, a driven member, means interconnecting said driving and driven members to transmit torque therebetween including three coil spring sleeves, each coil spring sleeve including a plurality of coil spring members having the coils thereof interdigitated, said coil spring sleeves having a nested telescoped relation with the inner spring sleeve positioned in the intermediate spring sleeve and the intermediate spring sleeve positioned in an outer spring sleeve, the coil springs of said outer and inner spring sleeves being wound in one direction and the coil springs of said intermediate spring sleeve being wound in the reverse direction, the number of coil spring members in said spring sleeves being within the range of 4 to 7, said driving and driven members having recesses therein in which the opposite ends of said spring sleeve are positioned, said driving and driven members having a hardness less than said spring members and said spring sleeves having a press-fit connection therein, and the ends of the spring members forming the outer spring sleeve including enlarged portions embedded into said driving and driven members.

20. A drive mechanism as defined in claim 19 wherein the ends of said spring members are preflattened to form said enlarged portions.

21. A drive mechanism comprising a driving member, a driven member, each of said driving and driven members having recesses therein, spring means for transmitting torque between said driving and driven members, the hardness of said spring means being substantially greater than the hardness of said driving and driven members, said spring means including a plurality of individual coil springs having the individual coils thereof interdigitated, said coil spring members having their opposite ends located in said recesses and flattened to form an enlarged portion thereon, and said coil spring members having a press-fit connection with said driving and driven members with said enlarged portions embedded in said driving and driven members.

22. A drive mechanism comprising a driving member, a driven member, said driving and driven members having recesses therein, spring means connected between said driving and driven members to transmit torque therebetween and provide for relative movement therebetween, said spring means comprising at least two coil spring sleeves having a telescoped relation, said spring sleeves including a plurality of spring members with the coils thereof interdigitated, said spring members having a hardness greater than the hardness of said driving and driven members, at least the springs of one of said sleeves having an enlarged portion on the ends thereof, and said spring members being positioned in said recesses and having a press-fit connection therewith with said enlarged portion embedded in said driving and driven members.

23. A drive mechanism comprising a driving member, a driven member, said driving and driven members having recesses therein, spring means connected between said driving and driven members to transmit torque therebetween and provide for relative movement therebetween, said spring means comprising at least three coil spring sleeves having a telescoped relation wherein the sleeves constitute inner, intermediate and outer sleeves, said spring sleeves including a plurality of spring members with the coils thereof interdigitated, said spring members having a hardness greater than the hardness of said driving and driven members, the springs of said outer sleeve having an enlarged portion on the ends thereof, and said spring members being positioned in said recesses and having a press-fit connection therewith with said enlarged portions embedded in said driving and driven members.

24. A drive mechanism as defined in claim 23 wherein the inner and intermediate spring sleeves have the same number of spring members therein and the ends of the spring members forming the inner and intermediate spring sleeves lie on concentric circles and are substantially equally spaced therearound, and the ends of the coil springs of the intermediate sleeve are spaced angularly from the ends of the coil sleeves of the inner sleeve a distance less than twice the thickness of the wire forming the coils thereof.

25. A drive mechanism comprising a driving member, a driven member, means for transmitting torque therebetween including at least two coil spring sleeves, each coil spring sleeve including an equal plurality of coil spring members having the coils thereof interdigitated, the coil spring members of one sleeve being wound in one direction and the coil spring members of the other sleeve being wound in the reverse direction, each of said coil spring members of one sleeve having their ends lying on the circumference of a first circle and the ends of the coil springs of the other sleeve lying on the circumference of a second circle concentric with the first circle, and the ends of the coil springs of the one sleeve member overlapping and being spaced angularly from the ends of the coil spring members of the other sleeve a distance less than twice the thickness of the wire forming the coil spring member.

26. A drive mechanism comprising a driving member, a driven member, means transmitting torque between the driving and driven members including three coil spring sleeves having a nested telescoped relation, the coil spring members of the inner and outer spring sleeves being wound in one direction and the coil spring members forming the intermediate spring sleeve being wound in the reverse direction, each of said coil spring members of each sleeve having its ends lying on the circumference of a circle, a plurality of the ends of the coil springs of the outer sleeve overlapping and being spaced circumferentially from the ends of the coil spring members of the intermediate sleeve a distance not greater than twice the thickness of the wire forming the spring members, and the ends of the coil springs of the inner sleeve overlapping and being spaced circumferentially from the ends of the coil spring members of the intermediate sleeve a distance not greater than twice the thickness of the wire forming the coils thereof.

27. A drive mechanism as defined in claim 26 wherein the opposite ends of the coil spring sleeves are press-fit into recesses in the driving and driven members and wherein the spacing of the ends of the individual springs of the coil spring sleeves provide a tight radial press-fit relationship with the driving and driven members with the spaced ends of the springs substantially bottomed in the recesses.

28. A drive mechanism as defined in claim 26 wherein the number of springs forming the outer coil spring member is greater by one than the springs forming the intermediate coil spring sleeve and the end of the extra coil spring of the outer spring sleeve is positioned intermediate the ends of the two adjacent springs forming the intermediate spring sleeve.

29. A method of assembling a drive mechanism comprising the steps of providing a plurality of first and second spring members of different diameters, interdigitating the coils of the first spring members to form a first spring sleeve, interdigitating the coils of the second spring members to form a second spring sleeve, assembling the spring sleeves in a nested telescoped relation, securing the opposite ends of said spring sleeves to driving and driven members, and establishing axial spacing between the coils of said sleeves and a radial pressure relationship therebetween.

30. A method of assembling a drive mechanism comprising the steps of providing a plurality of first and second spring members of different diameters, interdigitating the coils of the first spring members to form a first spring sleeve, interdigitating the coils of the second spring members to form a second spring sleeve, inserting the smaller diameter spring sleeve into the larger diameter spring sleeve and effecting a radial pressure relationship therebetween, axially spacing the adjacent coils of the first and second sleeves, and securing the opposite ends of said spring sleeves to driving and driven members.

31. A method of assembling a drive mechanism comprising the steps of providing a plurality of first, second and third spring members of different diameters, interdigitating the coils of the first spring member to form a first spring sleeve of a first diameter, interdigitating the coils of the second spring member to form a second spring sleeve of a second diameter, interdigitating the coils of the third spring member to form a third spring sleeve of a third diameter, assembling the three spring sleeves in a nested telescoped relation, establishing a radial pressure relationship between the first and second and second and third spring sleeves and an axial spacing between the axially adjacent coils of said sleeves, and securing the opposite ends of said spring sleeves to driving and driven members.

32. A method of assembling a drive mechanism as defined in claim 31 wherein at least one of said spring sleeves is formed with axial spaces between adjacent coils in excess of any spaces between another spring sleeve and wherein the establishment of the axial spaces is effected by applying a compressive force to the one spring sleeve compressing the one spring sleeve to the length of the other spring sleeve, securing the spring sleeves to the driving and driven members when the one sleeve is compressed and removing the compressive force from the one spring sleeve and thereby effecting expansion thereof and of the other spring sleeve to provide axial spaces between adjacent coils thereof and place at least one spring sleeve in tension and one in compression.

33. The method of assembling a universal joint comprising providing a pair of coil sleeve members one of which has axial spaces between the adjacent coils such that it is longer than another coil sleeve, assembling said coil sleeves in a nested telescoped relation, applying a compressive force to the one coil sleeve compressing the one coil sleeve, securing the opposite ends of said spring sleeves to end cap members when said one spring sleeve is compressed, and removing the compressive force from the one spring sleeve and thereby effecting expansion of the other spring sleeve and the one coil sleeve to provide axial spaces between the adjacent coils thereof.

34. The method of assembling a drive mechanism as defined in claim 33 wherein when said one sleeve is positioned in the opening through the other sleeve and in radial pressure relationship therewith and is compressed therein and on expansion thereof effects radial expansion thereof and increases the radial pressure relationship therebetween.

35. The method of assembling a drive mechanism comprising the steps of providing three spring sleeve members, each of which is comprised of a plurality of individual springs, one of the sleeves having adjacent coils thereof being spaced axially apart while the second and third are axially spaced to a lesser extent, assembling the three spring sleeves into a telescoped structure with the one spring sleeve being located internally of the second spring sleeve and the second spring sleeve being located internally of the third spring sleeve, compressing the spring sleeves to the same length, press-fitting one end of the said spring sleeves into a recess in one drive member by the compressive force, releasing the force compressing said spring sleeves and permitting expansion thereof, compressing the spring sleeves again, press-fitting the other end of the spring sleeves into a recess in another drive member by the compressive force, and releasing the compressive force and permitting axial expansion of the spring sleeves to effect axial spacing of the adjacent coils thereof whereby said one spring sleeve is placed in compression and the other spring sleeves are in tension.

36. The method of assembling a drive mechanism as defined in claim 35 wherein the number of springs in the inner and internal spring sleeves are equal and the ends thereof lie on circles of first and second diameters, respectively, and further including the step of indexing the springs so as to position the ends thereof equally around the circles with the ends of the springs in one sleeve being spaced from the ends of the springs in the other sleeve a distance not greater than twice the thickness of the wire of the springs.

37. The method of assembling a drive mechanism as defined in claim 35 further including the step of flattening the bottom faces of the springs in the spring sleeves prior to insertion into the recess in the end caps.

References Cited

UNITED STATES PATENTS

| | | | |
|---|---|---|---|
| 350,631 | 10/1886 | Leaman | 64—15 |
| 779,374 | 1/1905 | Phillips | 64—15 |
| 1,337,646 | 4/1920 | Eckart | 64—15 |
| 1,429,146 | 9/1922 | Karge | 64—15 |
| 1,489,439 | 4/1924 | Karge | 64—15 |
| 3,000,197 | 9/1961 | Ruegg et al. | 64—15 |
| 3,000,198 | 9/1961 | Stout | 64—15 |
| 3,245,228 | 4/1966 | Stuemky et al. | 64—15 |

FRED C. MATTERN, JR., *Primary Examiner.*

HALL C. COE, *Examiner.*